(12) United States Patent
Kenney et al.

(10) Patent No.: US 10,114,650 B2
(45) Date of Patent: Oct. 30, 2018

(54) PESSIMISTIC DEPENDENCY HANDLING BASED ON STORAGE REGIONS

(71) Applicant: Apple Inc., Cupertino, CA (US)

(72) Inventors: Robert D. Kenney, Austin, TX (US); Liang-Kai Wang, Austin, TX (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 14/629,464

(22) Filed: Feb. 23, 2015

(65) Prior Publication Data

US 2016/0246598 A1 Aug. 25, 2016

(51) Int. Cl.
*G06F 9/38* (2018.01)
(52) U.S. Cl.
CPC .......... *G06F 9/3838* (2013.01); *G06F 9/3834* (2013.01)
(58) Field of Classification Search
CPC ..... G06F 9/3838; G06F 9/3826; G06F 9/3834
USPC ........................................ 712/216
See application file for complete search history.

(56) References Cited

U.S. PATENT DOCUMENTS

| | | | |
|---|---|---|---|
| 5,544,337 A * | 8/1996 | Beard ............... | G06F 8/433 712/222 |
| 5,768,610 A | 6/1998 | Pflum | |
| 6,311,261 B1 | 10/2001 | Chamdani et al. | |
| 6,799,265 B1 | 9/2004 | Dakhil | |
| 7,340,590 B1 | 3/2008 | Sugumar et al. | |
| 7,734,897 B2 | 6/2010 | Mansell | |
| 2010/0332806 A1 * | 12/2010 | Golla ............... | G06F 9/3838 712/216 |
| 2012/0291037 A1 * | 11/2012 | Venkataramanan .. | G06F 9/3012 718/103 |
| 2015/0039867 A1 * | 2/2015 | Blomgren ........... | G06F 9/30145 712/225 |
| 2015/0378915 A1 * | 12/2015 | Gschwind ........... | G06F 9/467 711/130 |

* cited by examiner

*Primary Examiner* — Benjamin P Geib
*Assistant Examiner* — Shawn Doman
(74) *Attorney, Agent, or Firm* — Meyertons, Hood, Kivlin, Kowert & Goetzel, P.C.

(57) ABSTRACT

Techniques are disclosed relating to handling dependencies between instructions. In one embodiment, an apparatus includes decode circuitry and dependency circuitry. In this embodiment, the decode circuitry is configured to receive an instruction that specifies a destination location and determine a first storage region that includes the destination location. In this embodiment, the storage region is one of a plurality of different storage regions accessible by instructions processed by the apparatus. In this embodiment, the dependency circuitry is configured to stall the instruction until one or more older instructions that specify source locations in the first storage region have read their source locations. The disclosed techniques may be described as "pessimistic" dependency handling, which may, in some instances, maintain performance while limiting complexity, power consumption, and area of dependency logic.

18 Claims, 8 Drawing Sheets

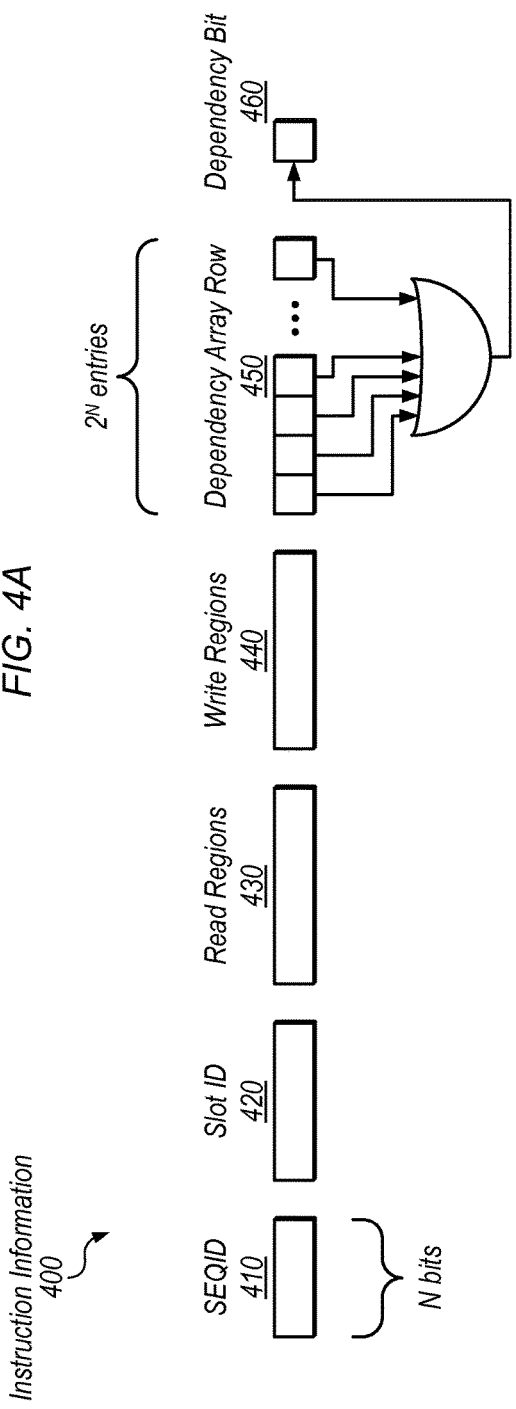
FIG. 4A
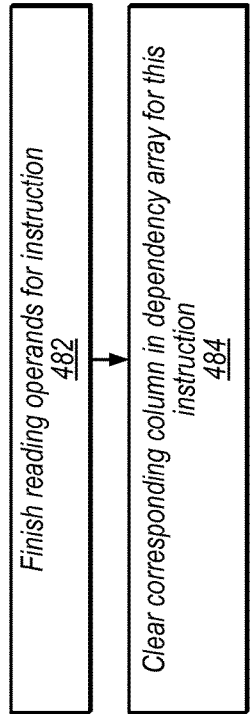
FIG. 4C
FIG. 4B

PESSIMISTIC DEPENDENCY HANDLING BASED ON STORAGE REGIONS

BACKGROUND

Technical Field

This disclosure relates generally to computer processing and more specifically to handling dependencies between instructions.

Description of the Related Art

Graphics processing units (GPUs) typically operate on large amounts of graphics data in parallel using multiple execution pipelines. Graphics data may be stored and moved between various different locations such as temporary registers, local memory, shared memory, pixel buffers, etc. Thus, one or more processing elements are typically configured to move graphics data between these locations in a pipelined manner, e.g., based on instructions of a graphics program.

When pipelining data movement instructions, dependencies between instructions must be handled to avoid access hazards. Access hazards also arise in many other computing situations in addition to data movement instructions. Traditional dependency checks in which all operands of an incoming instruction are compared with operands of older instructions may require complex content addressable memory (CAM) circuitry, which can consume considerable power and/or processing time.

SUMMARY

Techniques are disclosed relating to handling dependencies between instructions. In one embodiment, an apparatus includes decode circuitry and dependency circuitry. In this embodiment, the decode circuitry is configured to receive an instruction that specifies a destination location and determine a first storage region that includes the destination location. In this embodiment, the storage region is one of a plurality of different storage regions accessible by instructions processed by the apparatus. In this embodiment, the dependency circuitry is configured to stall the instruction until one or more older instructions that specify source locations in the first storage region have read their source locations. In some embodiments, a dependency array is used to maintain indicators based on read and/or write storage regions accessed by the instruction and the one or more older instructions. In some embodiments, two or more of the different storage regions are implemented using different storage types. Exemplary storage regions include a local memory, a shared memory, a register file, and a pixel buffer. In some embodiments, the dependency circuitry is configured to allow the instruction to proceed after the stall in response to determining that older instructions do not specify a source location in the first storage region. The disclosed techniques may be described as "pessimistic" dependency handling, which may maintain performance while reducing complexity, power consumption, and area.

In another embodiment, a method includes receiving an instruction that specifies a destination location, determining a first storage region that includes the destination location, and stalling the instruction until one or more older instructions that specify source locations in the first storage region have read their source locations. In one embodiment, the method further includes setting one or more read region indicators for the instruction and the stalling is a based on a comparison of one or more read region indicators set by the one or more older instructions and one or more write regions of the instruction. In some embodiments, the method includes resuming execution of the instruction in response to clearing of the one or more read region indicators set by the one or more older instructions, where the clearing is performed in response to reading of source locations by the one or more older instructions.

In yet another embodiment, a graphics processing unit includes decode circuitry and dependency circuitry. In this embodiment, the decode circuitry is configured to receive instructions in program order and route the instructions to ones of a plurality of pipelines, including a first instruction that specifies a destination location. In this embodiment, the decode circuitry is further configured to determine a first storage region that includes the destination location. In this embodiment, the dependency circuitry is configured to set one or more indicators each corresponding to the first instruction and an older instruction that species a source location in the first storage region where the older instructions is from the same task as the first instruction, clear ones of the one or more indicators in response to reading operands for older instructions from the first storage region, and stall the first instruction until the one or more indicators have been cleared.

BRIEF DESCRIPTION OF THE DRAWINGS

FIG. 4A is a diagram illustrating exemplary instruction information according to one embodiment.

FIGS. 4B-4C are flow diagrams illustrating exemplary embodiments of methods for generating and processing the instruction information of FIG. 4A.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1A:
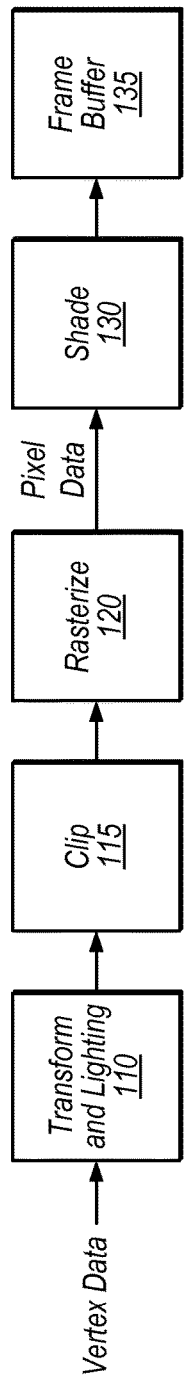
FIG. 1A is a block diagram illustrating an exemplary graphics processing flow.
Figure 1B:
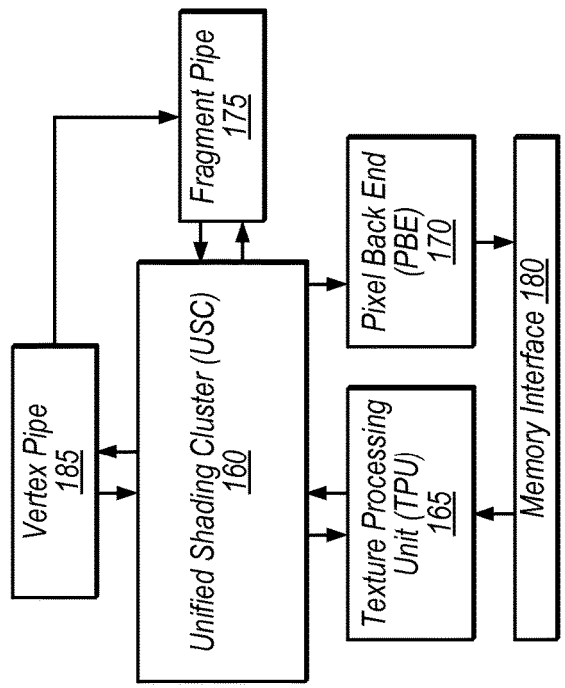
FIG. 1B is a block diagram illustrating one embodiment of a graphics unit.
Figure 2:
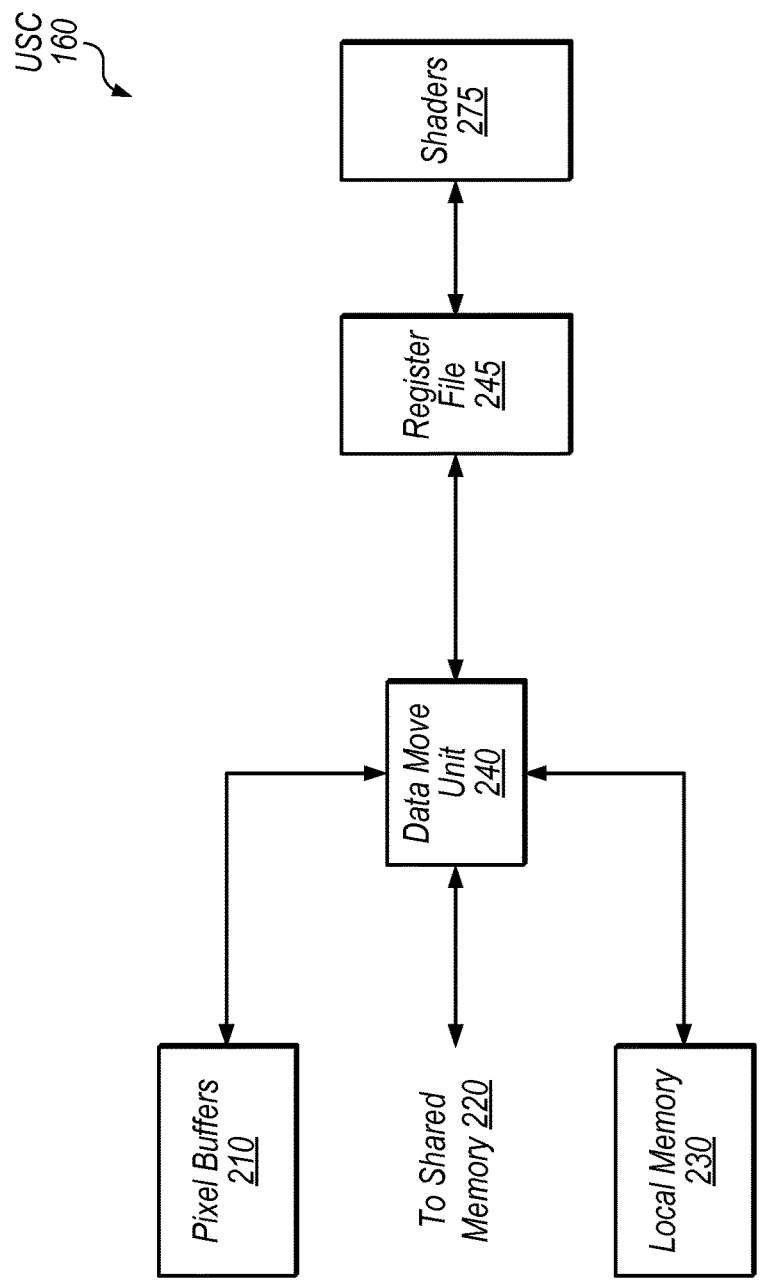
FIG. 2 is a block diagram illustrating one embodiment of a unified shading cluster (USC) that includes multiple different storage regions.
Figure 7:
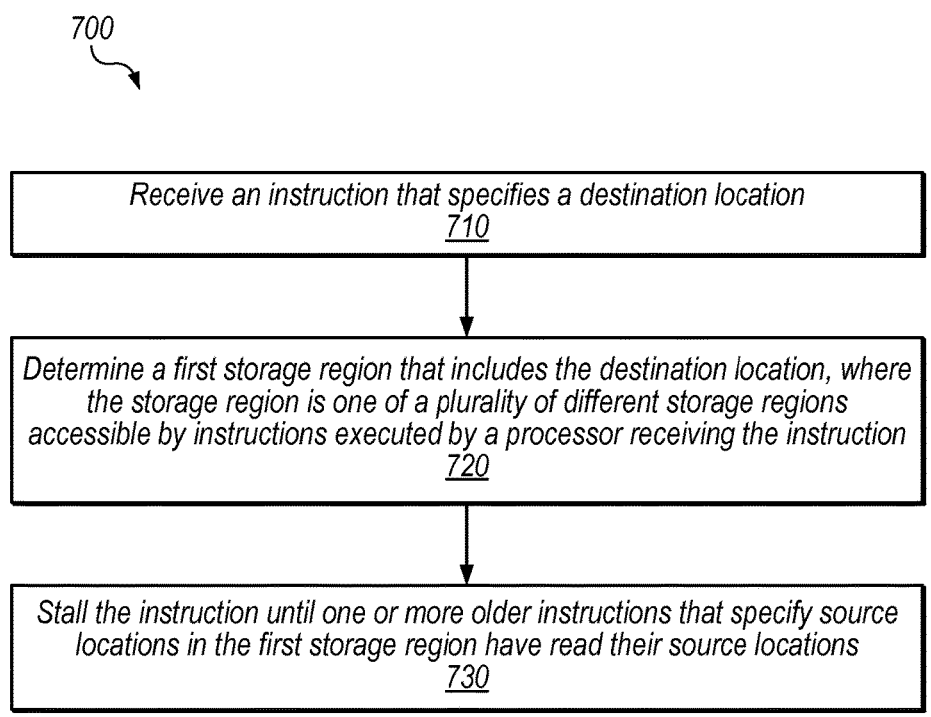
FIG. 7 is a flow diagram illustrating one embodiment of a method for pessimistic dependency handling.
Figure 8:
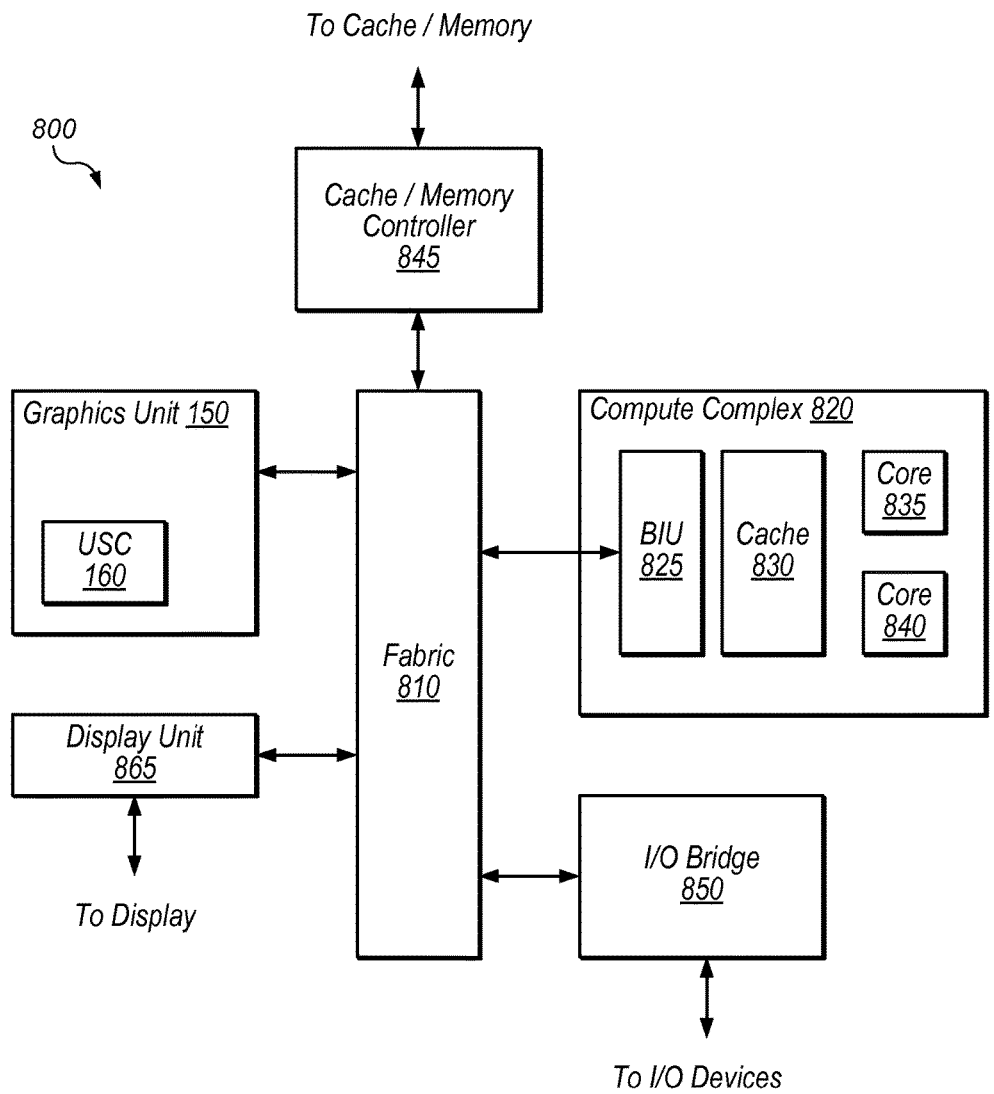
FIG. 8 is a block diagram illustrating one embodiment of a device that includes a graphics unit.

This disclosure initially describes, with reference to FIGS. 1A-B, an overview of a graphics processing flow and an exemplary graphics unit. FIG. 2 shows an exemplary embodiment of USC 160 that includes multiple storage regions. FIGS. 3-6 describe embodiments of circuitry configured to pessimistically resolve dependencies between instructions based on storage regions accessed by the instructions. FIG. 7 shows an exemplary method while FIG. 8 shows an exemplary device. The pessimistic dependency resolution techniques described herein may allow reductions in complexity and power consumption of dependency logic without substantial degradations in performance.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution pipelines for processing data in parallel. USC 160 may be referred to as "unified" in the illustrated embodiment in the sense that it is configured to process both vertex and fragment data. In other embodiments, programmable shaders may be configured to process only vertex data or only fragment data.

A "task," in the GPU context, refers to a set of operations to be performed for 1 to N execution instances, where N is an integer representing the maximum task size for a given embodiment. USC 160, in some embodiments, is configured to perform single instruction multiple data (SIMD) operations for vertex, pixel, and compute programs provided by a user. In these embodiments, USC 160 is configured to receive tasks that include from 1 to N SIMD instances and execute the same program (or set of instructions) for the 1 to N instances. N, in some embodiments, is the width of the SIMD implementation, e.g., the number of ALUs available for parallel operations. The type of instance may be based on the type of program. For example, a vertex task may run the same program on 1 to N vertices while a pixel task may run the same program on 1 to N pixels. In these embodiments, USC 160 is configured to execute a given task's program correctly, which may include managing dependencies between instructions within a task as well as managing any resources allocated to each task. In these embodiments, USC 160 includes resources for each task such as instruction dependency logic and an instruction address pointer. In one embodiment, USC 160 is configured to manage multiple tasks concurrently and maintain unique resources for each task, while execution pipelines may be shared by various in-flight tasks.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed portions of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview of Programmable Shader with Different Storage Regions

FIG. 2 is a block diagram illustrating one embodiment of a portion of USC 160. In the illustrated embodiment, USC 160 includes data move unit 240 which is configured to transfer data between pixel buffers 210, shared memory 220, local memory 230, and register file 245 based on instructions in a graphics program. In the illustrated embodiment, pixel buffers 210, shared memory 220, local memory 230, and register file 245 are examples of different storage regions accessible to instructions processed by USC 160. In various disclosed embodiments, pessimistic dependency checking techniques are performed based on the memory region(s) accessed by instructions of a given task.

Shaders 275, in the illustrated embodiment, are configured as execution instances to perform instructions of the graphics program (e.g., each execution instance may include a data path and execution pipeline that includes an ALU, etc.). In the illustrated embodiment, shaders 275 are coupled to read and write data from register file 245. In some embodiments, shaders 275 are also configured to access data in other storage regions. Even in these embodiments, however, data move unit 240 may be configured to move blocks of data to register file 245 to improve access times for shaders 275, in various situations.

Pixel buffers 210, in the illustrated embodiment, are configured to store attributes for each pixel, e.g., over multiple blending passes for a frame. Pixel buffers may include multiple pixel output registers. Pixel buffers 210 may be configured to eventually provide data to pixel back end 170.

Local memory 230 may be accessible only to USC 160 (or a portion thereof) and may be used by application developers to store various information, using program instruction of an ISA for USC 160.

Shared memory 220 may be a DRAM, for example and may receive information from outside of USC 160, e.g., via a direct memory access (DMA), which may be initiated outside of USC 160 or a data move instruction executed by data move unit 240. Shared memory 220 may be used to store uniforms and texture state words, among other information. Shared memory 220 may be accessible to multiple portions of USC 160 as well as other processing elements.

Register file 245, in the illustrated embodiment, includes temporary registers utilized by shaders 275. Register file 245 may include multiple banks and may be multi-ported. Register file 245 may be implemented using SRAM, for example. In some embodiments, each entry in register file 245 may include data for multiple different shaders.

Thus, in the illustrated embodiment, multiple different storage regions are accessible to be read and/or written by instructions processed by data move unit 240 and/or shaders 275. Various techniques may be used to identify which storage region(s) are accessed by a given instruction. For example, in various embodiments, the storage region(s) accessed by an instruction may be determined based on the nature of the instruction (e.g., based on its opcode), based on a header in the instruction specifying one or more storage regions, and/or based on one or more addresses specified by the instruction, etc. In other embodiments, other techniques for determining the storage region(s) accessed by an instruction may be utilized in addition to and/or in place of those disclosed herein.

As used herein, the term "storage region" is broad and refers to any group of two or more storage locations within a memory hierarchy, register set, etc. Thus, a single storage location or entry is not a storage region. A storage region may also be referred to as a "memory region." Storage regions may be determined or pre-determined such that they are set when a processing element is shipped and/or at runtime. Pessimistic dependency checking circuitry (matching circuitry in particular) may be more or less complex in various embodiments depending on the size of the defined storage regions relative to the size of the relevant memory structures. Typically, different storage regions are non-overlapping; embodiments with overlapping storage regions may add further pessimism to dependency checking without allowing further simplification.

Defining storage regions and using pessimistic dependency checking may be particularly useful in the graphics context because a GPU typically stores data in multiple different structures and graphics instructions often move data between those structures. Assigning storage regions to the various structures and/or portions thereof may allow pessimistic dependency checking to attain satisfactory performance with greatly reduced complexity, relative to non-pessimistic dependency checking.

In some embodiments, two or more different storage regions are implemented using different storage types. A "storage type" refers to the underlying storage technology used to implement locations in a storage region. For example, in one embodiment, register file 245 is implemented using SRAM while shared memory 220 is implemented using DRAM. In some embodiments, two or more different memory regions are implemented using the same storage type. Further, memory regions may be defined as portions of a particular storage structure, e.g., in some embodiments register file 245 may be split into two separate storage regions. Thus, different storage regions may or may not be implemented using the same storage type, in various embodiments.

In various embodiments, data move unit 240 is configured to execute instructions specifying data transfers between or within storage regions. However, any of various functionality described herein as being performed by data move unit 240 may also be performed by shaders 275 or any other appropriate circuitry, in other embodiments.

In some embodiments, write after read (WAR) hazards are handled by hardware while read after write (RAW) and write after write (WAW) hazards are enforced via software, e.g., by inserting fence instructions between dependent operations. A fence instruction typically prevents performance of instructions following the fence in program order until all instructions preceding the fence in program order have completed. Therefore, in various exemplary embodiments described herein, the disclosed circuitry is configured to protect against WAR hazards while software may be used to protect against RAW and/or WAW hazards. In other embodiments, however, similar circuitry and techniques may be used for RAW and WAW hazards, as well as various other events that involve dependencies. Thus, various indicators associated with reads may be used for writes and vice versa, for example, in these embodiments.

Exemplary Embodiments of Data Move Unit and Dependency Circuitry

Figure 3:
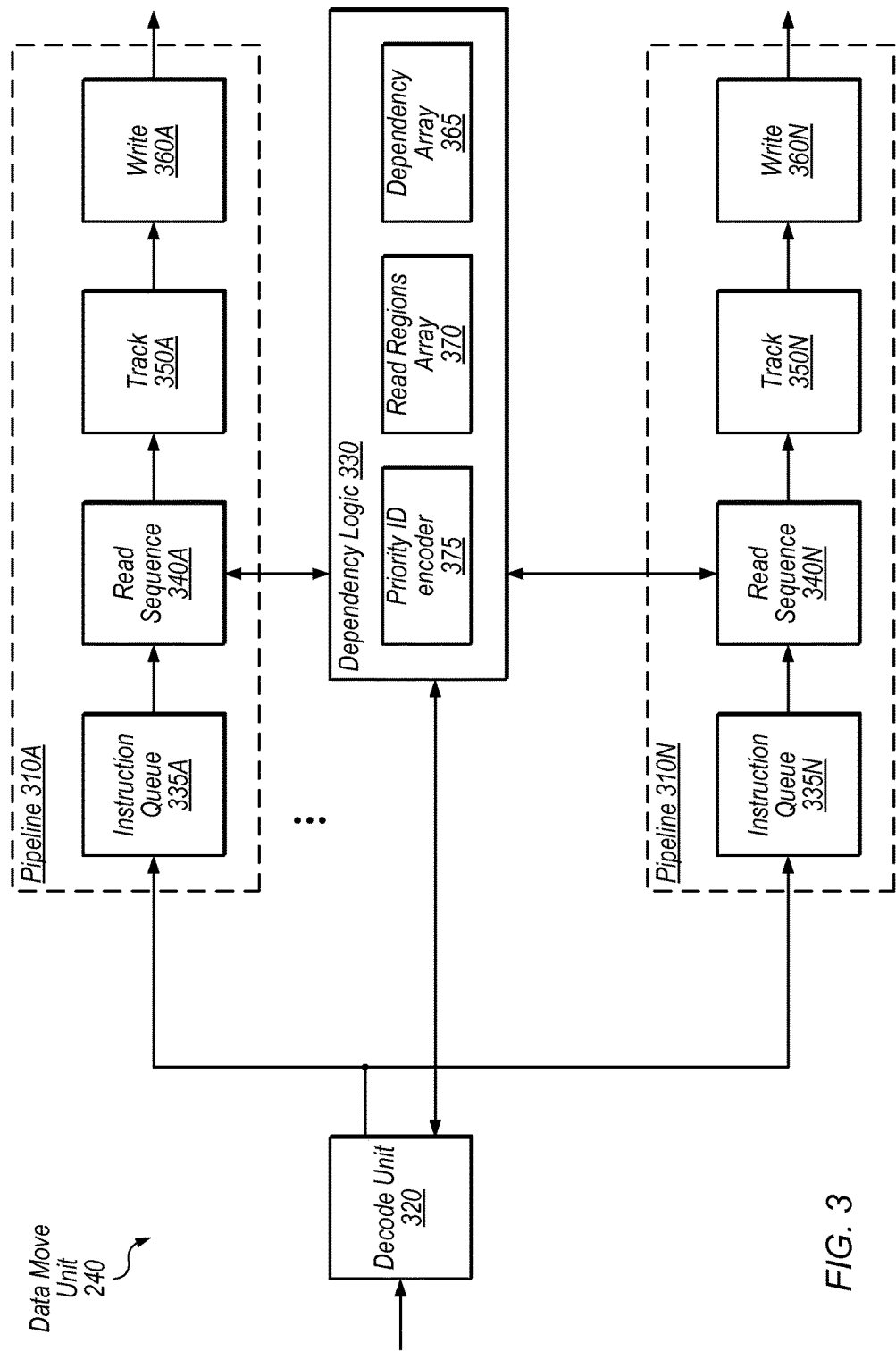
FIG. 3 is a block diagram illustrating one embodiment of a data move unit that includes dependency logic.

FIG. 3 shows one exemplary embodiment of data move unit 240. In the illustrated embodiment, data move unit 240 includes decode unit 320, dependency logic 330, and multiple pipelines 310A-N.

Pipelines 310, in the illustrated embodiment, each include the following stages: instruction queue 335, read sequence 340, tracking stage 350, and write stage 360. Instruction queue 335, in the illustrated embodiment, includes a plurality of entries configured to store instruction information, e.g., until execution resources are available. In some embodiments, instructions remain in instruction queue 335 when they are stalled to avoid access hazards. Read sequence 340, in the illustrated embodiment, is configured to launch requests to read data for input operands. Tracking stage 350, in the illustrated embodiment, is configured to track instructions until their data has been read. Write stage 360, in the illustrated embodiment, is configured to write back instruction results for any destination operands. Note that some instructions may not specify both input and destination operands and thus may skip read sequence 340 and/or write stage 360.

In the illustrated embodiment, instructions arrive at decode unit 320 in program order. Decode unit 320, in this embodiment, is configured to route instructions to pipelines 310, in which instructions may be processed out of program order. In some embodiments, decode unit 320 is configured to determine various information about instructions (described in further detail below with reference to FIG. 4) and transmit the information to dependency logic 330.

Dependency logic 330, in the illustrated embodiment, includes dependency array 365, read regions array 270, and priority ID encoder 375. In this embodiment, dependency logic 330 is configured to pessimistically stall instructions at or before read sequence 340 in order to resolve dependencies between instructions. In other embodiments, dependency logic may stall instructions at other locations, e.g., at write stage 360. Relative advantages and disadvantages of stalling at different stages are discussed in further detail below. In some embodiments, priority ID encoder 375 is at least partially included in decode unit 320.

Referring now to FIG. 4A, exemplary instruction information 400 is shown. In some embodiments, this information is determined for each instruction by decode unit 320 and/or dependency logic 330. In the illustrated embodiment, instruction information 400 includes sequential identifier (SEQID) 410, slot ID 420, read regions 430, write regions 440, dependency array row 450, and dependency bit 460.

SEQID 410, in some embodiments, is determined for each instruction by priority ID encoder 375. In these embodiments, priority ID encoder 375 is configured to assign a sufficient number of unique SEQIDs to cover all relevant instructions in data move unit 240 (where relevant instructions are instructions that could potentially cause an access hazard). In one embodiment, relevant instructions include all instructions that are decoded and pending (non-completed). In the embodiment of FIG. 3, relevant instructions are instructions that have been decoded but have not yet read all of their input operands. Thus, in the embodiment of FIG. 3, a SEQID 410 may be retired and reused once a corresponding instruction has read all of its input operands. In various embodiments, an instruction's SEQID 410 is passed down a pipeline 310 along with the instruction until the SEQID is retired. In the embodiment of FIG. 3, the number of SEQIDs 410 required may be (the number of pipelines 310) times (the number of entries in instruction queue 335 plus the number of instruction allowed in read sequence 340 at a time). In some embodiments, a validity array (not shown) is used to track what SEQIDs are valid and to assign unused/invalid SEQIDs to new instructions.

In some embodiments, priority ID encoder 375 is configured to prioritize assignment of identifiers at one end of a range of identifiers (e.g., lower values), which may reduce power consumption in maintaining and/or accessing dependency array 265 and/or read regions array 370.

Slot ID 420, in the illustrated embodiment, identifies a slot to which a task has been assigned for execution. Slot ID 420 may also be referred to as a task ID, in some embodiments. In some embodiments, each instruction is assigned a slot/task ID. In these embodiments, instructions with the same slot ID 420 are from the same task, typically via a one-to-one mapping between tasks and slots (although in some situations, a given task may be split into multiple slots for multi-sample anti-aliasing). Therefore, dependency checking does not need to be performed for instructions with different slot IDs, as instructions from each slot can be scheduled and executed independently, in these embodiments. Outside of the GPU context, dependency checking may or may not be performed for instructions from different threads, in various embodiments.

In some embodiments, validity information (not shown) is also maintained for each instruction. Instructions may normally be considered valid but may be marked as invalid based on an exception or an execution condition which is not met for a given instance, for example. Thus, dependency checking typically does not need to be performed for invalid instructions.

Read regions 430, in the illustrated embodiment, is a field indicating storage regions that include locations of input operands for the instruction. In one embodiment, each bit in this field indicates whether or not an instruction specifies an input operand from a given storage region. For example, in one embodiment, a first bit in read regions field 430 indicates whether or not the instruction specifies a read from register file 245 while a second bit in read regions field 430 indicates whether or not the instruction specifies a read from local memory 230. In other embodiments, other encodings may be used to indicate one or more storage regions from which an instruction specifies operand reads. In one embodiment, read regions fields 430 for pending instructions are stored in read regions array 370.

Write regions 440, in the illustrated embodiment, is a field indicating storage regions that include one or more destination locations for the instruction. In one embodiment, each bit in this field indicates whether or not an instruction specifies a destination operand for a given storage region. For example, in this embodiment, one bit in write regions field 440 indicates whether or not the instruction specifies a write to register file 245. In other embodiments, other encodings may be used to indicate one or more storage regions from which an instruction specifies operand writes.

Dependency array row 450, in the illustrated embodiment, indicates potential dependencies of the instruction on older instructions. In one embodiment, dependency array row 450 is a row in dependency array 365. In this embodiment, each column in dependency array 365 also corresponds to an instruction (e.g., based on its SEQID). In one embodiment, dependency array 365 includes #SEQID rows and #SEQID columns where #SEQID is the maximum number of SEQ-IDs 410 that dependency logic 330 is configured to issue. In this embodiment, each entry in dependency array 365 indicates whether an instruction corresponding to the row should potentially stall to avoid a dependency based on an instruction corresponding to the column.

Dependency bit 460, in the illustrated embodiment, is generated by ORing the bits of dependency array row 450. In one embodiment, if dependency bit 460 is set for a given instruction, dependency logic 330 is configured to stall that instruction until the dependency bit is cleared.

FIG. 4B is a flow diagram illustrating one embodiment of a method 470 for determining dependency array row 450. The method shown in FIG. 4B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 470 begins at step 472.

At step 472, a new instruction is received. In one embodiment, priority ID encoder 375 assigns a SEQID 410 to the instruction. Decode unit 320 may send the instruction to a pipeline 310. Decode unit 320 may determine the slot ID 420, read regions 430, and write regions 440 for the instruction. Dependency logic 330 may store the read regions 430 field in read regions array 370. Flow proceeds to step 474.

At step 474, for all outstanding older valid instructions with a matching slot ID 420 and an overlap between the write regions 440 of the new instruction and the read regions 430 of the older instructions, a corresponding entry in dependency array row 450 is set. For example, consider a new instruction that writes to register file 245 having a SEQID of 4. For an older valid instruction from the same slot that reads from register file 245 and has a SEQID of 7, the entry at row 4 and column 7 in dependency array 365 is set. Method 470 ends at step 474.

As discussed above, the new instruction may be stalled (e.g., based on dependency bit 460) until all entries in its row have been cleared, as discussed in detail below.

FIG. 4C is a flow diagram illustrating one embodiment of a method 480 for clearing entries in dependency array 365 (which may include dependency array row 450). The method shown in FIG. 4C may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 480 begins at step 482.

At step 482, the process of reading input operands for an instruction is finished. In one embodiment, read sequence 340 is configured to read the input operands for an instruction before sending the instruction to track stage 350. Flow proceeds to step 484.

At step 484, the column corresponding to the instruction is cleared in dependency array 365. This may allow one or more younger instructions in program order to proceed (assuming other entries in the one or more younger instructions' respective rows in dependency array 365 are not set). Method 480 ends at step 484.

The techniques discussed with reference to FIGS. 3 and 4A-4C are "pessimistic" in the sense that stalls may occur when there is not actually a dependency between instructions. However, because dependencies are marked early and enforced relatively late, in these embodiments, unnecessary stalls may be relatively infrequent. Further, the reductions in complexity and power consumption achievable using pessimistic dependency resolution (in contrast to dependency resolution checks in which stalls only occur if a dependency actually exists) may be substantial.

As mentioned above, stalls may occur at different places in different embodiments or in different modes or portions of a given embodiment. In the illustrated embodiment of FIG. 3, instructions are stalled at a read stage. In other embodiments, stalls may occur at a write stage (e.g., stage 360), for example. Stalling at different stages may alter the number of stalls for false dependencies in pessimistic dependency checking and the issuable number of SEQIDs necessary to uniquely identify relevant instructions. Thus, different stalls locations may be preferable in different designs (e.g., based on the number of pipelines and/or length of each pipeline).

Figure 5:
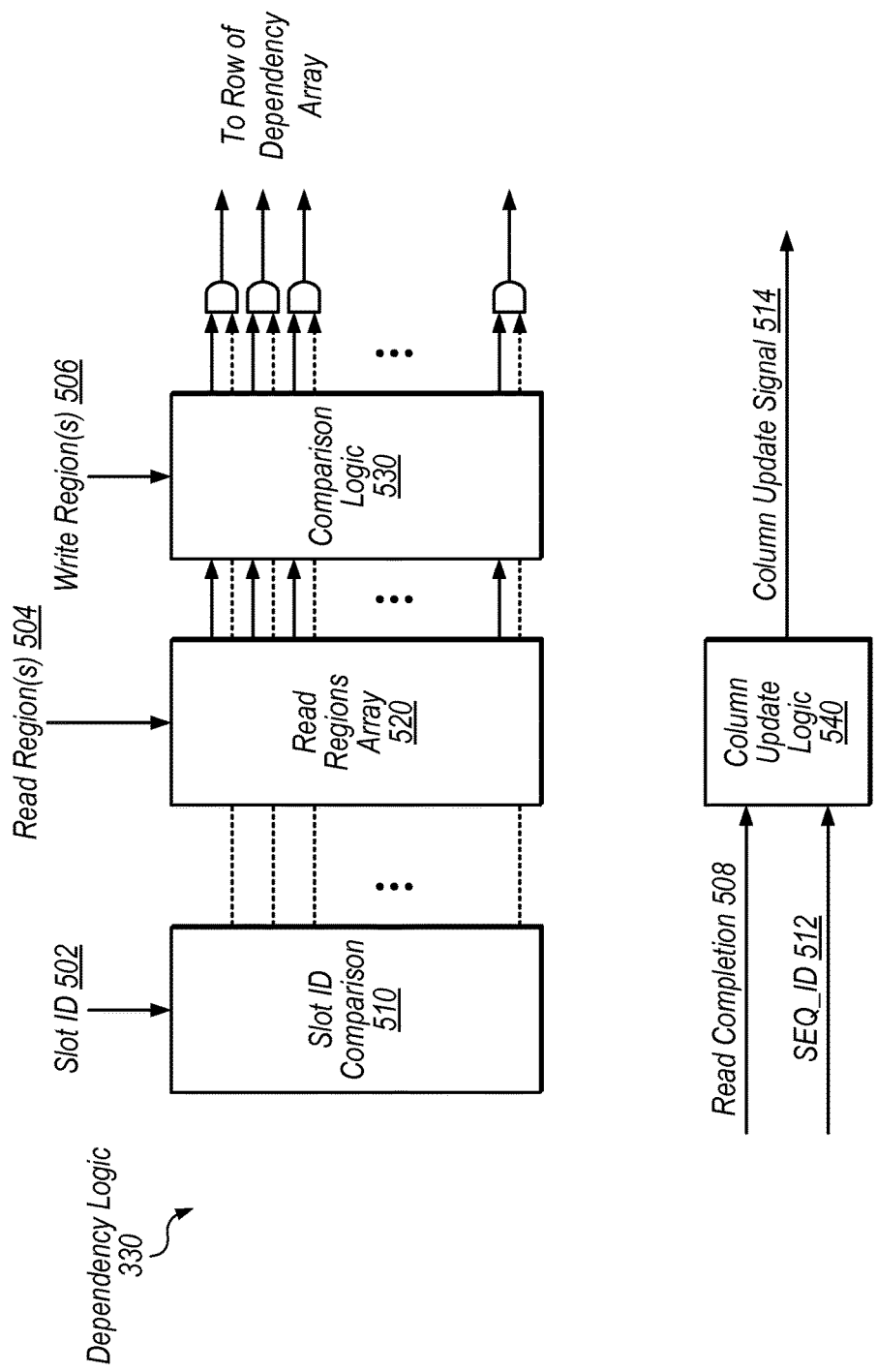
FIG. 5 is a block diagram illustrating one embodiment of dependency logic.

FIG. 5 shows a more detailed block diagram illustrating one embodiment of dependency logic 330 configured to perform the operations of FIGS. 4B-4C. In the illustrated embodiment, dependency logic 330 includes slot ID comparison 510, read regions array 520, comparison logic 530, and column update logic 540.

Slot ID comparison 510, in the illustrated embodiment, is configured to receive the slot ID 502 of a decoded instruction and compare it to slot IDs of other outstanding valid instructions in pipelines 310. The results of the comparisons are then sent to an array of AND gates at the right-hand side of FIG. 5 (shown using dashed lines to facilitate illustration).

Read regions array 520 is configured to receive the read region(s) 504 of the decoded instruction and store information indicating the read region(s) 504, e.g., for use in potentially stalling younger instructions.

Comparison logic 530, in the illustrated embodiment, is configured to compare the write region(s) 506 of the decoded instruction with read regions of older instructions. In the illustrated embodiment, matches are signaled and sent to the AND gates.

The AND gates, in the illustrated embodiment, are configured to indicate whether an older instruction from the same slot reads from the same memory region to which the decoded instruction writes. The outputs are used, in one embodiment, to configure a row of dependency array 365 corresponding to the decoded instruction. In one embodiment, the decoded instruction is then stalled until all entries in the row have been cleared.

Column update logic 540, in the illustrated embodiment, is configured to receive read completion signals 508 along with corresponding SEQIDs 512 and output a column update signal 514. In one embodiment, in response to determining that a given instruction has read all of its input operands, column update logic 540 is configured to clear a column in dependency array 365 corresponding to that instruction. In one embodiment, completion signals 508 may be received from various different units associated with different memory regions accessible to instructions.

Figure 6:
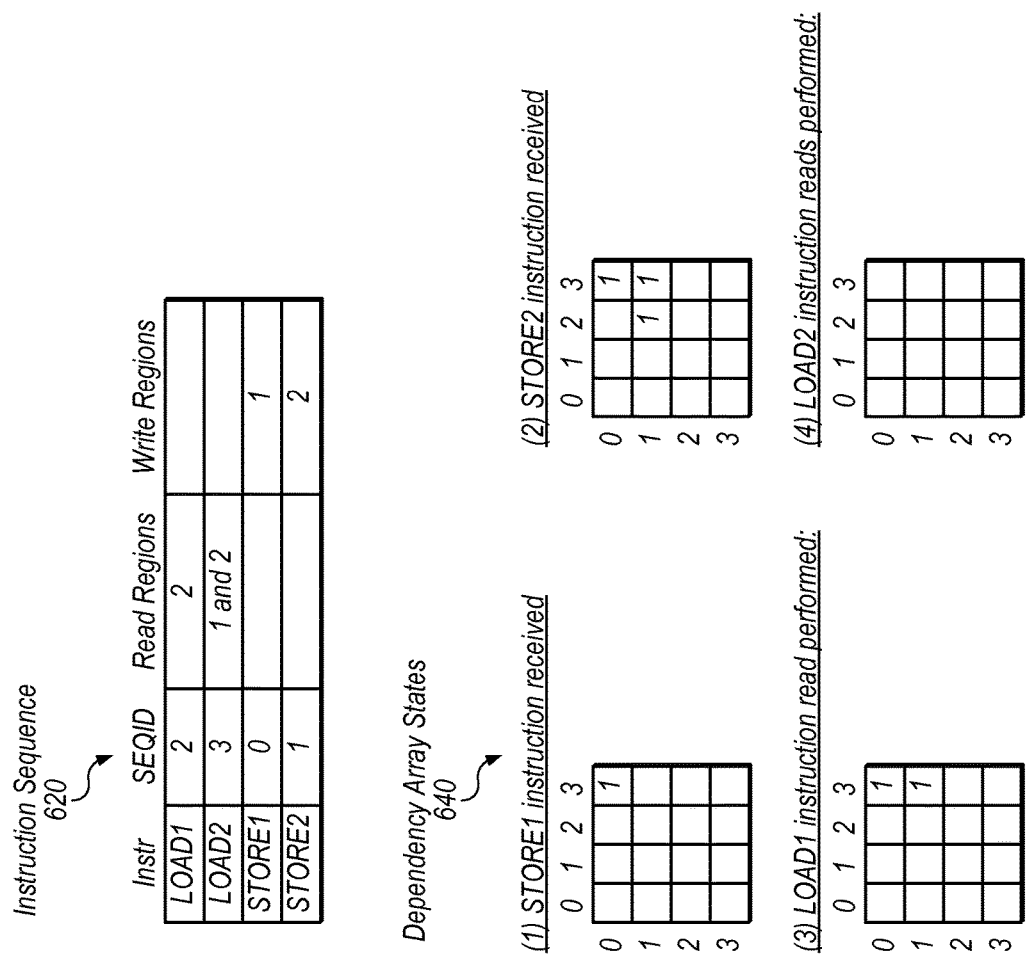
FIG. 6 is a diagram illustrating an exemplary instruction sequence and exemplary states of a dependency array based on the instruction sequence, according to one embodiment.

FIG. 6 shows exemplary states 640 of a dependency array at different points in time, based on execution of an exemplary instruction sequence 620. Instruction sequence 620, in the illustrated embodiment, includes the following sequence of instructions: load1, load2, store1, store2. For purposes of illustration, all instructions in exemplary sequence 620 are in the same task/slot. In the illustrated example, each instruction has been assigned a SEQID and read/write regions have been determined for each instruction. The storage regions are represented by the numbers 1 and 2, which may represent any of various appropriate storage regions (e.g., local memory 230 and register file 245). As shown, the load1 instruction includes an input operand from region two, the load2 instruction includes input operands from regions 1 and 2, and the store1 and store2 instructions have destination operands in regions 1 and 2 respectively.

Note that various operations described herein as performed by data move unit 240 may be performed by other processing elements (e.g., shaders 275) in various embodiments.

At point (1), the store1 instruction has been received. In response, dependency logic 330 has set an indicator in row 0 (corresponding to the store1 instruction) and column 3 (corresponding to the load2 instruction) because the load2 instruction specifies a read from the same region (region 1) to which the store1 instruction specifies a write.

At point (2), the store2 instruction has been received and dependency logic 330 has set indicators in row 1 (corresponding to the store2 instruction) columns 2 (corresponding to the load1 instruction) and 3 (corresponding to the load2 instruction) because the load1 and load2 instructions specify reads from the same region (region 2) to which the store2 instruction specifies a write.

Note that dependency logic 330, in some embodiments, is configured to stall the store1, and store2 instructions, at least at point (2), because each of their respective dependency array rows includes one or more indicators that are set.

At point (3) the load1 instruction's read has been performed from region 2. In response, dependency logic 330 has cleared the corresponding column (column 2) in the dependency array.

At point (4) the load2 instruction's reads have been performed. In response, dependency logic 330 has cleared column 3. At this point, in some embodiments, dependency logic 330 allows the store1 and store2 instructions to proceed because their respective rows in the dependency array are clear.

The exemplary sequence of instructions and 4×4 dependency array are provided for illustrative purposes only. In various embodiments, any of various sizes of dependency arrays and types of instruction sequences may be implemented.

Exemplary Method for Pessimistic Dependency Protection

Referring now to FIG. 7, a flow diagram illustrating one exemplary embodiment of a method 700 for pessimistic dependency handling is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 700 begins at step 710.

At step 710, an instruction is received that specifies a destination location. The destination may be specified explicitly or implicitly. A determination that the instruction specifies a destination location may be initially made based on an opcode of the instruction, for example. Flow proceeds to step 720.

At step 720, a first storage region that includes the destination location is determined. In the illustrated embodiment, the storage region is one of a plurality of different storage regions accessible by instructions executed by one or more processors capable of receiving and executing the instruction. In various embodiments, as discussed above with reference to the definition of a "storage region," each of the plurality of different storage regions includes a plurality of different locations accessible by instructions executed by the processor. Flow proceeds to step 730.

At step 730, the instruction is stalled until one or more older instructions that specify source locations in the first storage region have read their source locations. In some embodiments, the stalling is performed based on one or more older instructions that are valid and that are from the same task as the instruction, and not based on other types of instructions. In one embodiment, the method further includes setting one or more read region indicators for the instruction and the stalling may be based on a comparison of one or more read region indicators set by the one or more older instructions and one or more write regions of the instruction. In some embodiments, the method includes resuming execution of the instruction in response to clearing of the one or more read region indicators set by the one or more older instructions. The clearing may be performed in response to reading of source locations by the one or more older instructions. In some embodiments, the instruction is assigned a unique identifier by a decode unit. Method 700 ends at step 730.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 150, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of cores and/or caches. For example, compute complex 820 may include 1, 2, or 4 processors and/or processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processors and/or processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may be configured as described above with reference to FIGS. 1-4. Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   decode circuitry configured to:
      receive a first instruction that specifies a destination location;
      determine a first storage region that includes the destination location, wherein the first storage region includes a plurality of separately-accessible locations in addition to the destination location, and wherein the first storage region is one of a plurality of different storage regions accessible by instructions processed by the apparatus that each include a plurality of separately-accessible locations; and
      in response to determining the first storage region, update an entry in a region field for the first instruction, wherein the region field includes multiple entries that respectively indicate whether the first instruction accesses respective different ones of the plurality of different storage regions, and wherein the plurality of different storage regions are implemented using different memory circuit technologies; and
   dependency circuitry configured to:
      maintain, for each of multiple decoded instructions decoded by the decode circuitry including the first instruction, a dependency array that indicates a set of one or more older instructions that specify source locations in one or more storage regions accessed by the decoded instruction, wherein an entry in the dependency array for the first instruction is determined based on a comparison of the region field for the first instruction with region fields for older instructions; and
      stall the first instruction based on one or more older instructions indicated in the dependency array for the first instruction, without determining whether the source locations are the same location as the destination location.

2. The apparatus of claim 1, wherein the dependency circuitry is configured to stall the first instruction until the one or more older instructions that specify source locations in the first storage region have read their source locations.

3. The apparatus of claim 1, wherein the apparatus is configured, in response to receiving the first instruction, to set indicators in the dependency array corresponding to the first instruction and the one or more older instructions;
   wherein the apparatus is configured to clear the indicators in response to reading of operands for the one or more older instructions; and
   wherein the apparatus is configured to allow the first instruction to proceed in response to all indicators in the dependency array set by older instructions and corresponding to the first instruction being cleared.

4. The apparatus of claim 1, wherein the plurality of different storage regions include at least portions of: a local memory, a shared memory, and a register file.

5. The apparatus of claim 1, further comprising:
   a priority encoder configured to assign unique identifiers to decoded instructions, wherein the priority encoder is configured to prioritize assignment of identifiers at one end of a range of available identifier values.

6. The apparatus of claim 1, wherein the apparatus is configured to stall the first instruction at or before a pipeline stage configured to read instruction operands.

7. The apparatus of claim 1, wherein the apparatus is configured to stall the first instruction based on older instructions that are valid, that are from a same graphics processing task as the first instruction, and that specify source locations in the first storage region and not based on other types of older instructions.

8. The apparatus of claim 1, wherein the apparatus is configured to allow the first instruction to proceed after the stall in response to determining that pending older instructions do not specify a source location in the first storage region.

9. A method, comprising:
   receiving, by one or more processors, a first instruction that specifies a destination location;
   determining, by the one or more processors, a first storage region that includes the destination location and includes a plurality of separately accessible locations in addition to the destination location, wherein the first storage region is one of a plurality of different storage regions accessible by instructions executed by the one or more processors that each include a plurality of separately-accessible locations;

in response to determining the first storage region, update an entry in a region field for the first instruction, wherein the region field includes multiple entries that respectively indicate whether the first instruction accesses respective different ones of the plurality of different storage regions, and wherein the plurality of different storage regions are implemented using different memory circuit technologies;

maintaining, for each of multiple decoded instructions including the first instruction, a dependency array that indicates a set of one or more older instructions that specify source locations in one or more storage regions accessed by the decoded instruction, including determining entry in the dependency array for the first instruction based on a comparison of the region field for the first instruction with region fields for older instructions; and stalling, by the one or more processors, the first instruction at least until one or more older instructions indicated in the dependency array for the first instruction have read their source locations, without determining whether the source locations are the same location as the destination location.

10. The method of claim 9, further comprising:
setting one or more read region indicators for the first instruction;
wherein the stalling is based on a comparison of one or more read region indicators set by the one or more older instructions and one or more write regions of the first instruction.

11. The method of claim 10, further comprising resuming execution of the first instruction in response to clearing of the one or more read region indicators set by the one or more older instructions, wherein the clearing is performed in response to reading of source locations by the one or more older instructions.

12. The method of claim 10, further comprising clearing the one or more read region indicators for the first instruction in response to the first instruction reading its source locations.

13. The method of claim 9, further comprising a decode unit assigning identifiers to instructions, such that each instruction decoded by the decode unit that has not yet read its operands is assigned a unique identifier.

14. The method of claim 9, wherein the source locations specified by the one or more older instructions are different than the destination location.

15. The method of claim 9, wherein the one or more older instructions are valid instructions corresponding to a same graphics processing task as the first instruction.

16. A graphics processing unit, comprising:
decode circuitry configured to:
receive instructions in program order and route the instructions to ones of a plurality of pipelines, wherein a first instruction specifies a destination location;
determine a first storage region that includes the destination location, wherein the first storage region is one of a plurality of different storage regions accessible by instructions processed by graphics processing unit that each include a plurality of separately-accessible locations; and
in response to determining the first storage region, update an entry in a region field for the first instruction, wherein the region field includes multiple entries that respectively indicate whether the first instruction accesses respective different ones of the plurality of different storage regions, and wherein the plurality of different storage regions are implemented using different memory circuit technologies; and
dependency circuitry configured to:
maintain, for each of multiple decoded instructions decoded by the decode circuitry including the first instruction, a dependency array that indicates a set of one or more older instructions that specify source locations in one or more storage regions accessed by the decoded instruction;
set one or more indicators in the dependency array for the first instruction corresponding to one or more older instructions that specify a source location in the first storage region, wherein the one or more older instructions are from the same task as the first instruction, wherein setting an indicator in the dependency array for the first instruction is based on a comparison of the region field for the first instruction with region fields for older instructions;
clear ones of the one or more indicators in response to reading operands for older instructions from the first storage region; and
stall the first instruction until the one or more indicators have been cleared.

17. The graphics processing unit of claim 16, wherein the dependency circuitry is configured to set and clear the one or more indicators based on older instructions that are valid and from the same task as the first instruction, and not based on other types of older instructions.

18. The graphics processing unit of claim 16, wherein the plurality of different storage regions include: a storage region that includes storage locations for pixel information, a storage region that is shared with processing elements other than the graphics processing unit, and a storage region that includes registers.

* * * * *